United States Patent Office 3,214,153
Patented Oct. 26, 1965

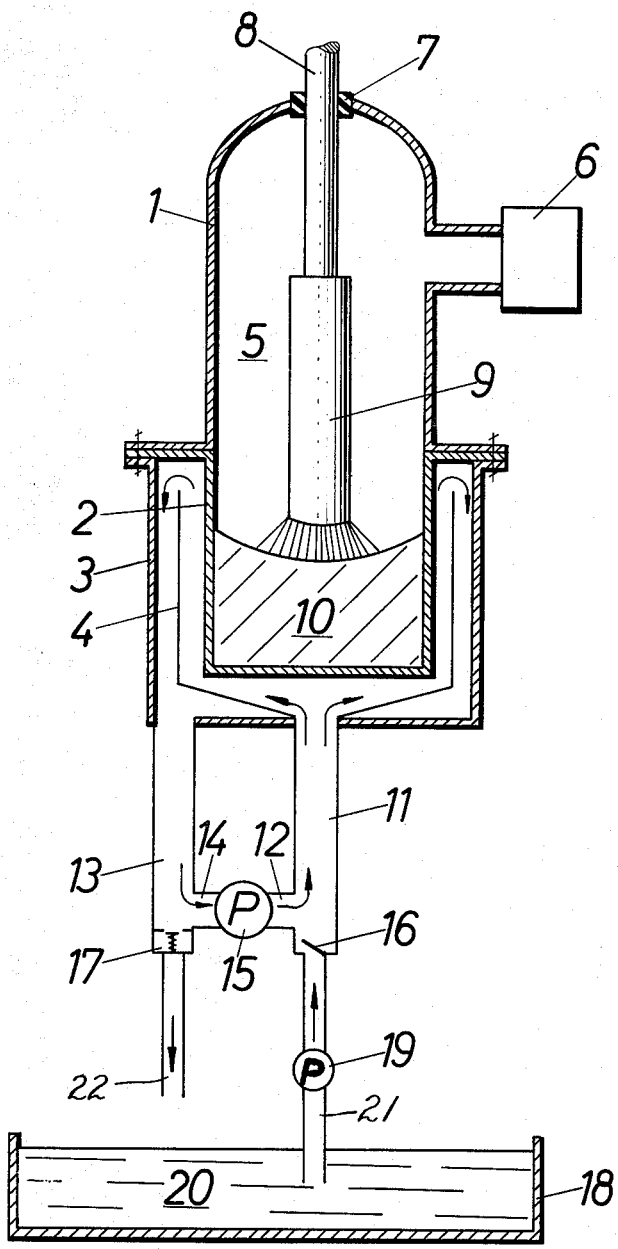

3,214,153
COOLING WATER SUPPLY SYSTEM
Alfred Hauff, Bruchkobel, near Hanau am Main, and Helmut Scheidig, Hanau am Main, Germany, assignors to W. C. Heraeus G.m.b.H., Hanau am Main, Germany, a German firm
Filed Nov. 15, 1963, Ser. No. 324,042
Claims priority, application Germany, Nov. 17, 1962, H 47,430
2 Claims. (Cl. 263—44)

The present invention relates to a cooling water supply system which is especially suitable for vacuum melting furnaces and similar apparatus.

In a vacuum arc furnace operating with a consumable electrode, this electrode is melted at its free end into a crucible which is inserted into a cooling vessel or surrounded by a cooling jacket so as to insure that the heat which is produced during the melting process will be conducted away as quickly as possible, for example, by a circulation of water. The electric output of a larger vacuum arc furnace may amount during the melting process to about 500 kw. In order to avoid the formation of steam bubbles on the wall of the crucible, it is necessary to provide a high rate of flow of the cooling water, for example, about 2000 l./min. for a vacuum arc furnace of the above-mentioned size. If the circulation of cooling water is insufficient or even stopped entirely, the result may be that an electric arc impinging on the crucible might perforate it and that water may penetrate into the crucible. This would not only ruin the entire charge but may even result in an explosion of the arc furnace. The high velocity of flow which is required for the safety of the furnace and its operation necessitates that the cooling capacity of the water is utilized only to a small extent. In actual practice, the increase in temperature may amount, for example, to only 3° C. The cooling water supply systems which have previously been used for arc furnaces in which the entire cooling water is taken out of a reservoir and again returned thereto, have the disadvantage that very extensive safety measures have to be taken so as to prevent overheating of the crucible for a lack of a sufficient flow of cooling water.

The principal objects of the present invention are to provide a cooling-water supply system of the above-mentioned type for vacuum melting furnaces, such as vacuum arc furnaces, which overcomes the disadvantages of the systems previously employed, permits a considerable reduction in the water consumption, may be installed and operated at a low cost, and reduces to a minimum the dangers of operating such a furnace.

For achieving theses objects, the invention provides that for attaining a cooling water circulation of a high velocity of flow, a circulating pump be installed between the feed and return lines for the cooling water. Another feature of the invention consists in providing a check valve in the cooling water feed line between a water reservoir or other water supply and the pipe connection leading to the circulating pump, and in providing a pressure relief valve or an overflow in the cooling water return line between its outlet into the water reservoir and the pipe connection leading to the circulating pump. The cooling water supply system according to the invention has the advantage over the known water supply stems that, even though the high required velocity of the flow of water is maintained, the consumption of water is considerably reduced, that the costs of installation and operation of the system are reduced, and that, if for any reason the supply of cooling water might be insufficient or even interrupted entirely, the independent circulation of cooling water by means of the circulating pump will effect an emergency cooling of the crucible with a flow of water which is fully adequate in order to avoid the formation of steam bubbles on the wall of the crucible. This independent circulation of cooling water may be continued for additional cooling even at the time when the feed and return lines for the cooling water to and from the reservoir are shut off intentionally when the melting process is completed and also when the crucible filled with the melted charge and disposed in the cooling vessel is transported to a place where it is allowed to cool off. While such additional cooling could be effected by means of the known cooling water supply systems only with very great difficulties and at a considerable expense, it can now be carried out in a very simple and inexpensive manner. The cooling water supply system according to the invention has the further advantage that the feed and return flow of cooling water to and from the reservoir or other water supply may be considerably reduced, namely, to a volume which is just sufficient to take up the amount of heat which is produced by the melting process and which may be accurately calculated. It is then even possible to tolerate a considerable increase in temperature of the cooling water, for example, of 30° C. If, for example, the flow of cooling water required by a vacuum arc furnace of the capacity as first described amounts to about 2000 l./min. only about 200 l./min. of fresh cooling water will be withdrawn from the reservoir, whereas about 1800 l./min. will be circulated by the circulating pump of the independent circulating system.

The cooling water supply system according to the invention may be installed with very simple means. It operates perfectly even in cases of emergency, for example, when the supply of fresh water is stopped, and in such cases it does not require the melting process to be immediately interrupted as is necessary in the known cooling water systems.

The features and advantages of the present invention will become further evident from the following description of a cooling water supply system according to this invention which is to be read with reference to the accompanying drawing.

This drawing illustrates diagrammatically the upper furnace part 1 to which a crucible 2 is hermetically connected which is mounted in a cooling vessel 3 which contains a baffle 4 for guiding the cooling water in the proper directions. The furnace chamber 5 may be evacuated by the vacuum as required for the melting process by means of a vacuum pump unit 6. During the melting process, an electrode supporting rod 8 is gradually advanced through suitable sealing means 7 into the furnace chamber 5. This supporting rod 8 carries a consumable electrode 9 which is melted off continuously at its lower end by an electric arc so as to form the molten charge 10. The cooling vessel 3 is connected to a water feed line 11 and a water return line 13 leading to a water reservoir 18. These two lines 11 and 13 are connected by pipe connections 12 and 14 to a circulating pump 15 which is adapted to circulate the largest amount of cooling water directly through the cooling vessel 3 which is required for safely carrying out the melting process in the crucible 2. Between the reservoir 18 and the connection 12 to the circulating pump 15 the feed line 11 contains a check valve 16 which prevents any flow of water through the fresh-water supply line 21 toward the reservoir 18. Similarly, a pressure relief valve 17 is connected to the return line 13 between the connection 14 to the circulating pump 15 and the line 22 leading to the reservoir 18. These valves 16 and 17 may also be shut off manually or additional shutoff valves may be provided, as well as connecting elements, not shown, for severing the main feed lines 11 and 13 from the lines 21 and 22 leading to the water reservoir 18 when the melting operation has been completed and the cooling vessel 3 with the crucible 2 and the melted charge therein is to be removed from the furnace together with the circulating pump 15 and its connections to the cooling vessel when this pump continues in operation to cool the crucible and the charge therein. For supplying fresh cooling water 20 from the reservoir 18 to the main feed line 11 during the melting process, a pump 19 may be provided in the line 21. The arrows which are shown in the drawing indicate the main circulation of cooling water by means of pump 15 and also the supply of fresh cooling water from the reservoir 18 through the line 21 and the return of the used water through the relief valve 17 and line 22 to the reservoir.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. A cooling water supply system for the crucible of a vacuum furnace, comprising an integral unit including
   (1) a cooling vessel adapted for containing and surrounding the crucible,
   (2) a cooling water feed line having a cooling water inlet and an outlet connected to said vessel,
   (3) a cooling water return line having a cooling water outlet and an inlet connected to said vessel,
   (4) a water shut-off means mounted at the cooling water inlet of the feed line,
   (5) a water shut-off means mounted at the cooling water outlet of the return line,
   (6) a connecting line between the return and feed lines,
   (7) a circulating pump in said connecting line for continuously circulating cooling water from the return line into the feed line; and
   (8) a supply of cooling water connectable to the inlet of the feed line.

2. The cooling water supply system of claim 1, further comprising a baffle in the cooling vessel for guiding the cooling water from the outlet of the feed line to the inlet of the return line.

References Cited by the Examiner

UNITED STATES PATENTS

| | | | |
|---|---|---|---|
| 3,019,274 | 1/62 | Gruber et al. | 13—31 |
| 3,118,013 | 1/64 | Garmy | 263—44 X |

FOREIGN PATENTS

| | | |
|---|---|---|
| 556,464 | 4/58 | Canada. |

CHARLES SUKALO, *Primary Examiner.*

JOHN J. CAMBY, *Examiner.*